United States Patent
Cox et al.

[11] 3,724,485
[45] Apr. 3, 1973

[54] FLOW CONTROLLER

[75] Inventors: Robert M. Cox, Northridge; Ernest W. Crowley, Chatsworth; Dan L. Kilmer, Tujunga, all of Calif.

[73] Assignee: Servo Labs, Inc., Van Nuys, Calif.

[22] Filed: May 12, 1971

[21] Appl. No.: 142,638

[52] U.S. Cl. .................137/117, 137/110, 251/129
[51] Int. Cl. ............................................G05d 7/01
[58] Field of Search ........137/117; 251/30, 129, 131; 91/429

[56] References Cited

UNITED STATES PATENTS

| | | | |
|---|---|---|---|
| 3,152,603 | 10/1964 | Zeisloft | 137/117 |
| 3,572,365 | 3/1971 | White | 137/117 |
| 2,843,147 | 7/1958 | Penther | 251/131 X |
| 3,462,115 | 8/1969 | Barker | 251/30 X |
| 2,681,116 | 6/1954 | Treseder | 91/429 X |
| 2,791,229 | 5/1957 | Pasco | 137/117 |
| 3,219,095 | 11/1965 | Nilsson | 251/129 X |

Primary Examiner—Robert G. Nilson
Attorney—Fulwider, Patton, Rieber, Lee & Utecht

[57] ABSTRACT

A flow controller using a solenoid controlled valve to pass a series of high-frequency flow pulses of controlled and variable duration resulting in an average output flow rate that varies linearly with variations in pulse duration. A relief valve maintains a constant pressure differential across the solenoid valve, and an accumulator smooths the output of the controller. Also disclosed is an embodiment having a pair of solenoid valves operating out of phase with each other, and a third embodiment having a pressure-balanced flow multiplier for controlling a proportional flow of substantially greater magnitude through a secondary flow line. Conventional pulse-width modulation techniques are used to activate each control valve.

21 Claims, 6 Drawing Figures

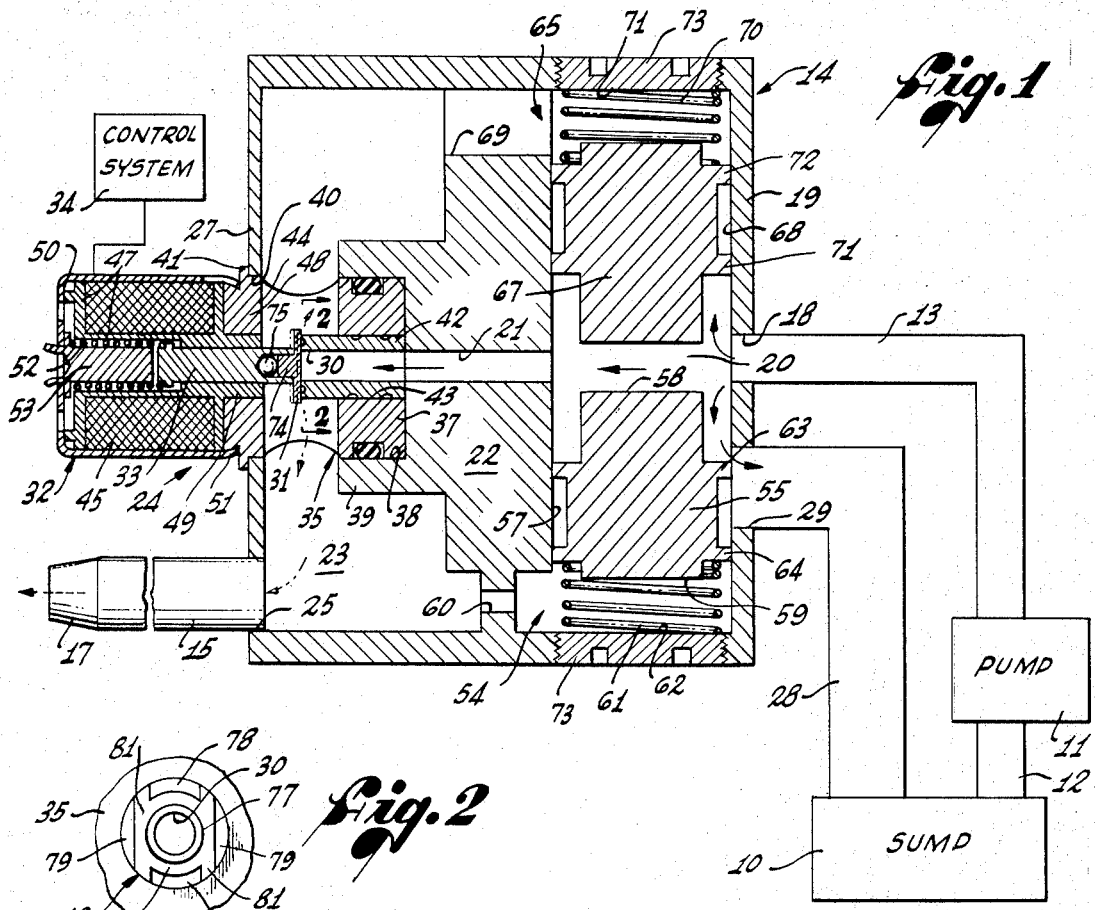
Fig. 1
Fig. 2
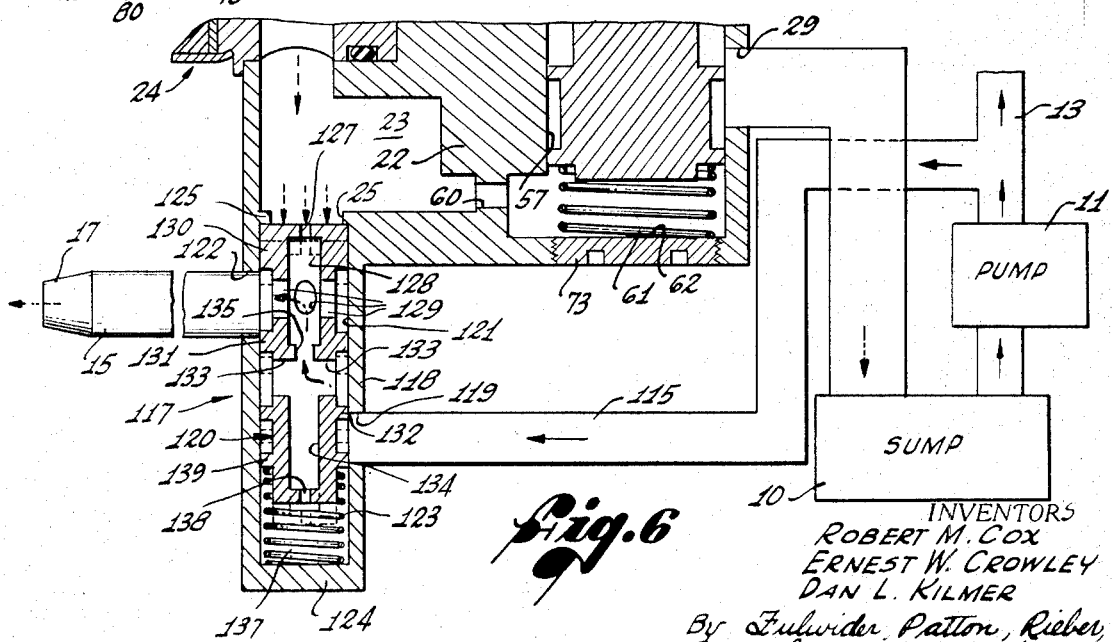
Fig. 6
INVENTORS
ROBERT M. COX
ERNEST W. CROWLEY
DAN L. KILMER
By Fulwider, Patton, Rieber, Lee, and Utecht
ATTORNEYS INVENTORS
ROBERT M. COX
ERNEST W. CROWLEY
DAN L. KILMER
By Fulwider, Patton, Rieber,
Lee, and Utecht
ATTORNEY

FLOW CONTROLLER

BACKGROUND OF THE INVENTION

This invention relates generally to a flow controller and, more particularly, to a controller for selectively varying and regulating the rate of flow of fluid such as fuel to a using device such as an internal combustion engine. For example, one use for which the controller is particularly well suited is the control of the rate of delivery of fuel in the fuel injection system of a gas turbine engine for a vehicle such as a truck, to increase or decrease the fuel flow on demand in order to satisfy the varying fuel requirements during starting, idling, acceleration, deceleration and steady running at different selected speeds.

Presently available controllers, which are operated largely by mechanical, hydraulic or pneumatic means, either lack the wide range of control capacity, accuracy of fuel regulation and versatility needed for optimum engine control, or are so complex in construction and operation as to be impractical for many purposes. In addition, many such conventional approaches to fuel control have relatively slow responses to changing fuel demands.

SUMMARY OF THE INVENTION

The present invention resides primarily in a flow controller in which the output flow rate is determined by a closure member that is movable rapidly back and forth relative to an output orifice to open and close the latter, and including electromechanical operating means responsive to a train of high-frequency control signals producing actuating pulses of selectively variable duration to open and close the orifice cyclically for a preselected interval during each cycle, as determined by the pulse duration. The pressure differential across the output orifice is maintained constant despite variations in operating conditions, thereby to insure that the output of the controller varies directly with variations in the duration of the signal pulses, and the actuating means include a control system for generating a series of signal pulses and selectively modulating the duration of the pulses. Thus, in its broader aspects, the invention resides in a flow controller that is operable when activated to pass a series of flow pulses of selected and variable duration, and thereby to produce a selectively variable, average output flow.

More specifically, in the preferred embodiments of the invention shown herein for purposes of illustration, the electromechanical operating means comprise a solenoid for reciprocating the closure member toward and away from the output orifice, and a control system which generates a cyclical electromechanical control signal and produces a train of control pulses from that signal for activating the solenoid to open the output orifice once each cycle for the duration of each control pulse. The system uses conventional pulse generating and modulation techniques to select the portion of each cycle during which a pulse is produced and, therefore, the duration of each interval during which the orifice is open.

A constant pressure differential is maintained across the orifice by a relief valve which senses sustained relative changes between the inlet and outlet sides of the orifice and correspondingly changes the inlet pressure, and the output of the controller is smoothed out to a substantially uniform flow by a pressure-responsive accumulator which is charged with a portion of the output each time the orifice is open, and then automatically discharges when the orifice is closed. The relief valve and accumulator advantageously are formed by two closed-coupled spools mounted in a common bore with the inlet to the orifice between them and with the opposite ends of the bore communicating with the outlet side of the spool, with means for delaying the pressure response of the relief valve spool until after the accumulator has responded to momentary pressure changes resulting from the pulsing flow.

A second embodiment of the invention uses two solenoids to control and alternate the flows through parallel orifices, and includes a control system for alternately energizing the solenoids for timed intervals that are out of phase with each other. This effectively doubles the flow capacity of a controller having components of comparable size and power, and also serves to smooth the flow to some extent. In the lower portion of the available flow range, each orifice is opened while the other is closed, and in the upper portion of the range, the outputs overlap.

In a third embodiment of the invention, the variable output of a single solenoid valve is used as a pilot flow for actuating a flow multiplier which proportionally varies a secondary flow rate of substantially higher magnitude, and mixes the pilot and secondary flows as the combined output of the controller. The flow multiplier has a pressure-balancing valve which responds to the pilot flow to variably throttle the secondary flow and maintain its output pressure equal to the pilot pressure while maintaining a preselected ratio between the flow rates.

Other objects and advantages of the invention will become apparent from the following detailed description, taken in conjunction with the accompanying drawings.

BRIEF DESCRIPTION OF THE DRAWINGS

FIG. 1 is a schematic view of a fuel supply system including a flow controller embodying the novel feature of the present invention, with the flow controller shown in cross-section and having a single control valve;

FIG. 2 is an enlarged fragmentary end view of the output orifice of the control valve, the view being taken along the line 2—2 of FIG. 1;

FIG. 6 is a fragmentary schematic view of a third embodiment of the invention utilizing a single control valve similar to that in FIG. 1 to actuate a flow multiplier for proportionally controlling a larger secondary flow.

DETAILED DESCRIPTION OF THE FIRST EMBODIMENT (FIGS. 1 AND 2)

Figure 3:
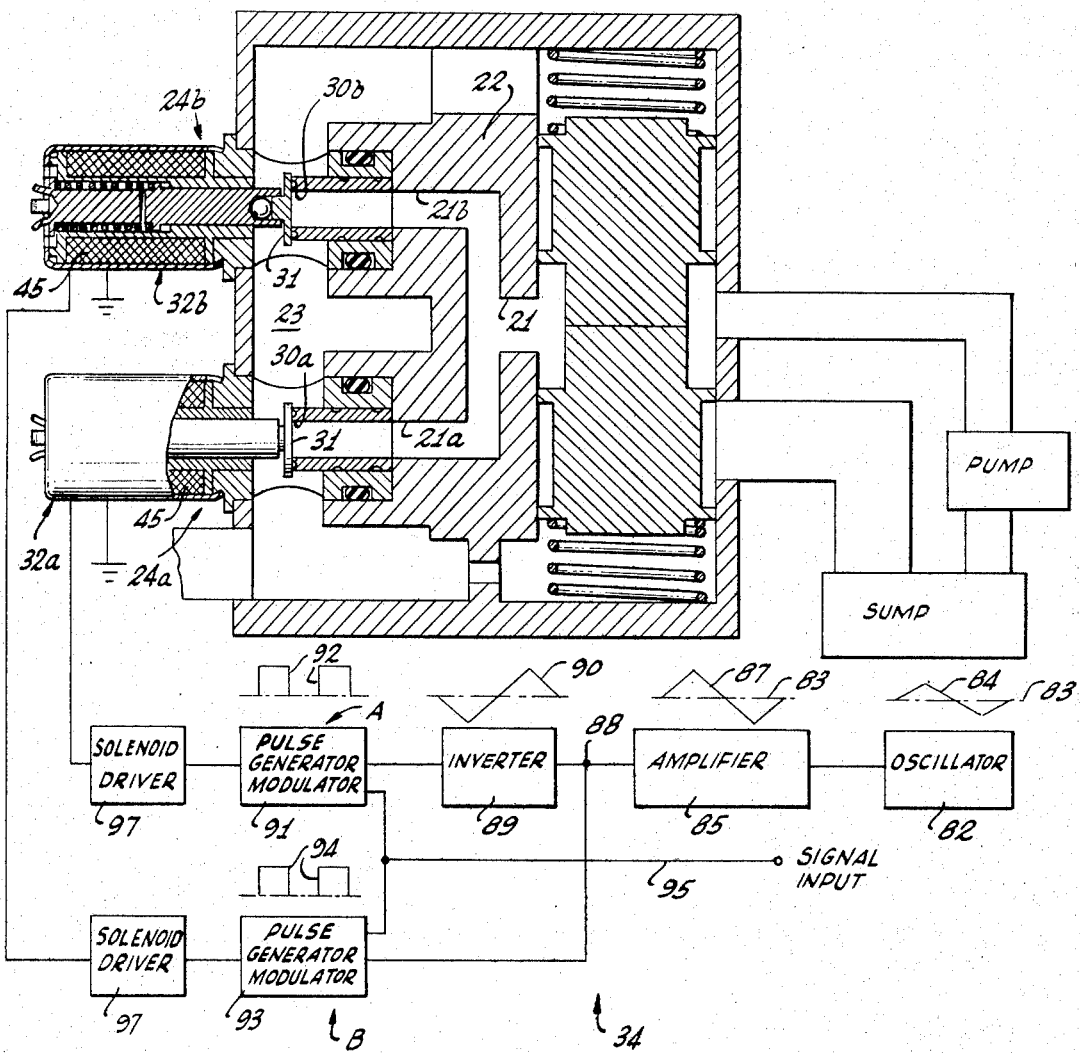
FIG. 3 is a schematic view generally similar to FIG. 1, but with parts in moved positions, showing a second embodiment of the invention utilizing two control valves, one shown in section and one in partial section, and including a schematic representation of a control system for generating control signals for the valves and producing modulated control pulses from said signals.

As shown in the drawings for purposes of illustration, the invention is embodied in a supply system for feeding fuel at selected rates into an engine (not shown) such as a gas turbine, to vary the power output of the engine. In general, the system includes a fuel source shown schematically as a sump 10, a constant volume pump 11 having an in-take communicating with the sump through line 12 and delivering fuel under substantially constant pressure to a supply line 13, and a flow controller 14 receiving the output of the pump through the supply line 13 and delivering fuel at a preselected, variable rate to an output line 15 leading to the engine, the output line in this instance terminating in a nozzle 17 for injecting the fuel into the gas turbine.

The flow controller 14 shown in FIG. 1 is enclosed in a housing having an inlet port 18 in one side, the right side 19 as viewed in FIG. 1, communicating with the supply line 13 to admit the output of the pump 11 into an inlet chamber 20 in the right-hand portion of the housing. From this chamber, a passage 21 extends through an interior partition 22 in the housing to an outlet chamber 23 in the left-hand portion of the housing, through a selectively variable control valve 24 for regulating the rate of flow from the inlet chamber 20 to the outlet chamber 23. The outlet line 15 receives fluid from the outlet chamber through an outlet port 25 in the left side 27 of the housing, to which one end of the outlet line is connected.

With this arrangement, the rate of fluid flow from the controller 14 to the gas turbine is determined by the control valve 24 which admits a selected portion of the pump output into the outlet chamber 23 and thus into the outlet line 15. By variably activating the control valve, the rate of flow of fuel can be changed to vary the power output of the engine in accordance with changing operational requirements. A return line 28 opens into the inlet chamber 20 of the controller through a port 29 in the right side 19 to receive excess fluid delivered by the pump 11 and return such fluid to the sump 10.

In accordance with a primary aspect of the present invention, the control valve 24 has an orifice 30 through which fluid is admitted from the passage 21 into the outlet chamber 23, a closure member 31 movable rapidly back and forth relative to the orifice between open and closed positions, and operating means for moving the closure member cyclically back and forth between the open and closed positions in response to a train of control signals in the form of high-frequency signal pulses of selectively variable duration. This, together with means for maintaining a constant pressure differential across the control valve, results in a flow rate through the valve that is proportional to the selected duration of the pulses.

More specifically, in the preferred embodiments of the invention, the valve-operating means comprise an electromechanical operator in the form of a solenoid 32 having a plunger-type armature 33 carrying the closure member 31 for reciprocation toward and away from the orifice 30 in response to alternate energization and deenergization of the solenoid, and an electrical control system 34 for producing a high-frequency train of regular and rapid electrical pulses for cycling the control valve on a periodic basis, the control system also serving to modulate the width of the pulses to vary the portion of each cycle during which the valve is open. Although the valve is opened only momentarily during each cycle (for example, for a period less than one-fiftieth of a second), the control system produces a plurality of cycles per second (for example, fifty cycles per second) for a rapidly pulsating flow producing a preselected average flow rate which varies linearly with variations in the duration of the individual pulses.

As shown in FIG. 1, the illustrative valve operator 32 is mounted on the left side 27 of the controller housing on a mounting sleeve 35 sealed at its inner end 37 in a recess 38 in a boss 39 projecting to the left from the partition 22, and press-fitted adjacent its outer end in an opening 40 in the left side of the housing, the mounting sleeve having an annular locating flange 41 which abuts against the outside of the housing. The orifice 30 is formed by the open left or outer end of a tubular sleeve 42 which is pressed into a bore 43 in the inner end portion of the mounting sleeve, in alignment with the passage 21 through the partition so as to form an extension of this passage. The tubular orifice sleeve projects into a cross-bore 44 in the central portion of the mounting sleeve communicating at both ends with the outlet chamber 23 of the housing, above and below the mounting sleeve.

The solenoid 32 has a coil 45 that is wound on a conventional spool 47 which is coaxial with the mounting sleeve 35 and extends outwardly from the outer end portion 48 of this sleeve. The solenoid spool is located on the mounting sleeve by a tubular extension 49 of the spool which is fitted into the outer end of the mounting sleeve, and is locked in place by a cup-shaped case 50 which encloses the solenoid and is crimped around the outer end of the mounting sleeve at 51, outwardly beyond the locating flange 41. The operator may be enclosed in an extension (not shown) of the housing to avoid fluid leakage problems.

The armature 33 of the solenoid 32 is telescoped into the spool 47 through the tubular extension 49 thereof, with a close sliding fit, and projects into the cross-bore 44 of the mounting sleeve 35 with the closure member 31 on its right or inner end for engagement with the adjacent end of the sleeve 42 defining the orifice 30. A coiled return spring 52 is compressed between an annular rib on the outer end portion of the armature and a similar rib on the outer end portion of an elongated plug 53 fastened to the outer end wall of the solenoid case and extending inwardly through the spring, to the right in FIG. 1, toward the outer end of the armature.

Accordingly, the return spring 52 urges the armature 33 to the right toward the orifice 30, normally holding the closure member 31 against the orifice to restrict and preferably close the latter. The armature is movable to the left, however, as permitted by a gap between the adjacent ends of the plug and the armature, to shift the closure member to the left and open the orifice 30.

Herein, this is accomplished by energizing the coil 45 of the solenoid to create a magnetic field which acts on the armature to overcome the spring force and move the armature to the left. When the coil is deenergized, the spring 52 returns the armature to the closed position. It will be apparent to those skilled in the art, however, that the functions of the spring and the solenoid might be reversed.

As explained more fully hereinafter in connection with the description of a suitable control system 34, the alternate energization and deenergization of the solenoid 32 with a train of electrical signal pulses is effective to reciprocate the armature 33 at high speed to open the orifice 30 periodically for successive preselected, controlled time intervals. By varying the length of these intervals, the average output of the control valve 24 for a given period of time can be varied to produce different output rates for the controller 14, and these output rates vary in direct relation with variations in the duration of the "open" time for each cycle, so long as the pressure differential across the orifice 30 is maintained substantially constant.

Herein, the pressure differential across the orifice 30 is controlled by means of a relief valve 54 responsive to sustained increases and decreases in the pressure of the fluid in the outlet chamber 23 and operable to vary the flow through the return port 29 from the inlet chamber 20 to correspondingly vary the pressure in the inlet chamber and maintain the pressure a preselected increment above the outlet pressure. For this purpose, the relief valve comprises a spool 55 movable in a bore 57 extending downwardly from the inlet chamber. The spool has an upper end 58 exposed to the fluid in the inlet chamber and a lower end 59 exposed to fluid in the lower end portion of the bore, which communicates with the outlet chamber through a damping orifice 60. A light coiled spring 61 is compressed between the spool and the lower end 62 of the bore to urge the spool upwardly with a preselected force, and an annular rib 63 around the spool forms a land that is movable downwardly along the wall of the bore, from a position above the return port 29, to open the port and progressively increase its effective flow area as the spool moves downwardly in the bore. A second rib 64 adjacent the lower end of the spool forms a second land for sealing the lower end portion of the bore from the return port. Preferably, the exposed, oppositely facing end surface areas of the spool 55 are equal so that the force exerted by the spring 61 serves to produce the pressure differential that is maintained across the orifice 30.

In effect, the relief valve spool 55 compares the pressures in the inlet and outlet chambers 20 and 23 and, as the pressure differential tends to increase, (for example, due to an increasing output flow rate or increased external flow resistance), moves upwardly to restrict the flow through the return port 29 and increase the pressure in the inlet chamber. As the outlet chamber pressure drops, (for example, due to a reduction in output flow rate or reduced external flow resistance), the relief valve spool 55 moves downwardly to increase the effective flow area of the return port, and, therefore, to reduce the inlet chamber pressure.

It will be evident from the foregoing that the output of the control valve 24 is a pulsating flow which varies periodically from the full flow rate produced with the existing pressure differential when the orifice is fully opened, to no flow when the orifice is closed. For purposes of this discussion, both the progressive acceleration of the flow rate as the valve is opened and the progressive deceleration of the flow rate as the valve is closed may be ignored, in view of the virtually immediate response of the control valve to its operating signals. Thus, the flow rate may be considered as going immediately from zero to full rate when the solenoid is energized and then back to zero when the solenoid is deenergized. It will be apparent, however, that the immediacy of response depends upon the mass of the mechanical elements that must be moved, the fluid resistance to such movement, and the power available to effect such movement.

While the flow pulses may be so closely spaced as to minimize the pulsing effect, the invention also contemplates the provision of an accumulator 65 which is charged through the outlet chamber 23 with a portion of the output of the control valve 24 each time the latter is open, and then discharges fluid to the outlet chamber while the control valve is closed. In this manner, the pulses are smoothed out and the output flow of the control valve is distributed more evenly over the full duration of each cycle of the valve.

In this instance, the accumulator 65 is formed by a spool 67 that is slidably mounted in a second bore 68 which extends upwardly from the inlet chamber 20 and communicates at its upper end with the outlet chamber 23 through a passage 69 formed in the partition. A spring 70 is compressed between this spool and the upper end 71 of the bore to urge the spool toward the inlet chamber, and spaced annular ribs 71 and 72 on the spool form lands which seal against the wall of the bore.

As in the case of the relief valve 54, the accumulator 65 is responsive to changes in the pressure differential across the orifice 30 to move the spool 67 toward the inlet chamber 20, downwardly in FIG. 1, as the pressure in the outlet chamber 23 increases relative to the pressure in the inlet chamber, and to move the spool back toward the outlet chamber, upwardly in FIG. 1, as the relative pressure in the outlet chamber decreases. Accordingly, each time the control valve 24 opens the orifice 30 and admits a pulse of fluid into the outlet chamber 23, the resulting momentary increase in the pressure in the outlet chamber is transmitted through the passage 69 to the upper end of the accumulator bore 68, above the accumulator spool 67, and thus shifts the spool downwardly to increase the volume of the bore above the spool and store a charge of fluid in this increased volume. Then, after the control valve closes the orifice and terminates the pulse of fluid, the resulting drop in the pressure in the outlet chamber is accompanied by movement of the accumulator spool upwardly in the bore, by the force of the pressure in the inlet chamber 20, and the accumulated charge of fluid thus is pumped into the outlet chamber to maintain a flow out through the outlet line 15.

Although both the accumulator spool 67 and the relief valve spool 55 are arranged to respond to a change in the pressure differential across the orifice 30, the accumulator passage 69 is of substantially greater cross-sectional area than the damping orifice 60, which constitutes a flow restriction between the outlet chamber 23 and the relief valve 54. This restriction produces a time delay or lag in the operation of the relief valve as compared to the accumulator, this time lag being sufficient to prevent material responses of the relief valve to the pressure changes resulting only from pulses in the flow until the accumulator itself responds and supplies fluid to the outlet chamber. Only if there is a sustained change in overall output flow rate, input flow rate, or external flow resistance, is there a change in outlet chamber pressure of sufficient duration to effect a material and lasting change in the return flow rate through the relief valve.

While the bores 57 and 68 of the relief valve 54 and the accumulator 65 might be arranged differently, it is considered important from a structural standpoint that, as illustrated schematically in FIG. 1, the bores are the opposite end portions of a single cross-bore extending through the housing and herein closed at its ends by plugs 73, which may be threaded into the housing as shown, or simply ball plugs (not shown) pressed into the ends of the cross-bore. In this manner, the two spools 55 and 67 are mounted in close-coupled relation on opposite sides of the inlet chamber 20, which is defined by the central portion of the cross-bore between the inlet port 18 and the adjacent end of the passage 21 leading to the orifice 30.

The flow controller 14 of the present invention may be operated satisfactorily with one-half inch diameter spools 55 and 67 and with springs 61 and 70 having low spring rates which assure substantially constant pressure differentials for all flow rates through the controller. For a pressure differential on the order of 25 psi, the springs should exert average forces on the order of five pounds. A typical maximum flow rate capacity for such a controller is 0.6 gallons per minute. It has been found that the flow rate varies linearly with variations in pulse duration in the range of approximately ten to ninety percent of full capacity.

The preferred valve closure member 31 herein comprises a generally flat disk having a coaxial stud 74 on one side, the side remote from the orifice 30, extending loosely into a blind bore in the adjacent end of the solenoid armature 33. The inner end of this stud abuts against a spherical ball 75 positioned against the closed end of the bore, thereby mounting the closure member on the armature for limited tilting and enabling the closure member to seek an optimum position for closing the orifice 30.

Further, the end surface of the sleeve 42 defining the orifice 30 is specially contoured to enhance the ability of the closure member 31 to close rapidly and seal tightly against the sleeve and, at the same time, to enable the sleeve to withstand the repeated impacts of the closure member after prolonged use. For these purposes, a flat sealing surface 77 (FIG. 2) of narrow radial width is formed around the orifice to avoid any substantial trapping of fluid and resulting fluid resistance to closing, and coplanar positioning surfaces 78 and 79 on the sleeve are spaced outwardly from and around the sealing surface to assist in sustaining impacts and aligning the closure member with the plane of the sealing surface. The recesses separating the various coplanar surfaces permit free flow of fluid out of the space between the sleeve and the closure member as the latter approaches the orifice during closing.

As shown most clearly in the enlarged view of the end of the sleeve in FIG. 2, the sealing surface 77 is an annulus between the orifice 30 and an annular groove 80 coaxially encircling the orifice. This groove may be formed by a circular milling cut. Two parallel cross grooves 81, which may be milling cuts generally tangent to the annular groove, divide the remainder of the end of the sleeve into four coplanar surfaces in oppositely disposed pairs 78 and 79, which are spaced around, and outwardly from, the sealing surface 77, to align the closure member 31 with the plane of the sealing surface and distribute the impact. The cross grooves 81, of course, provide exit paths for fluid that otherwise could be trapped between the closure member and the orifice sleeve.

DESCRIPTION OF THE SECOND EMBODIMENT (FIGS. 3 AND 4)

An alternative embodiment of the fuel supply system for obtaining a higher order of flow rates with components similar to those illustrated in FIG. 1 is shown in FIG. 3, wherein corresponding parts are indicated by the same reference numbers, some having letters for purposes of distinguishing certain parts. In this embodiment, the outlet end portion of the main flow passage 21 through the partition 22 is formed as two branches 21a and 21b which lead to two orifices 30a and 30b opening into the outlet chamber 23. The flow through each of these orifices is controlled by a solenoid operator 32a, 32b for reciprocating a closure member 31 toward and away from the associated orifice, the solenoids being alternately energized and deenergized out of phase with each other (so that one valve is open when the other is closed) for flow rates in the lower portion of the available range, and to open the orifices in an overlapping manner for flow rates in the higher portion of the available range.

In all other important respects, the flow controller shown in FIG. 3 may be virtually identical to that shown in FIG. 1, with appropriate detailed changes in construction and operation resulting from the use of two control valves 24a and 24b rather than one. The operational differences will be apparent from the following description of the electrical control system for this embodiment.

It will be seen in FIG. 3 that the schematic control system, indicated generally at 34, has two channels A and B for driving the respective solenoid operators 32a and 32b. Conventional pulse-width modulation techniques are utilized to derive the train of control signals for each solenoid, the illustrative control system including an oscillator 82 which generates a high-frequency electrical signal which varies periodically above and below a reference level 83 as a triangular waveform shown at 84 in FIG. 3. It will be apparent that a wide range of frequencies is available for use in connection with the invention, a preferred range being 30 to 60 cycles per second, and the illustrative frequency being 50 cycles per second.

The waveform 84 is amplified by an amplifier 85, as shown at 87, and is applied to both control channels A and B through a junction 88. In channel A, the waveform is inverted by an inverter 89, as indicated at 90, and then is applied to a pulse generator and modulator 91 which produces rectangular signal pulses as indicated generally at 92. The amplified waveform 87 is applied unaltered in channel B to a second pulse generator and modulator 93 which also produces rectangular pulses 94, but phase shifted 180° with respect to the output of the other modulator because the triangular waveform is inverted in channel A.

A common input signal is applied to both pulse generators and modulators 91 and 93 through an input line 95 to select different pulse control levels on the triangular waveforms and thereby modulate the width of the rectangular pulses 92 and 94 to determine the time duration of the pulses. The signal is a d.c. voltage level corresponding to the desired "open" time for each valve, and may be derived from a potentiometer (not shown) or the like constituting part of the throttle control of the fuel supply system.

Each channel also has a solenoid driver 97 through which the respective pulses are applied to the associated solenoid coil 45. Thus, each channel periodically energizes the associated coil for selected time intervals determined by the pulse duration selected for each cycle of the triangular waveform.

Figure 4:
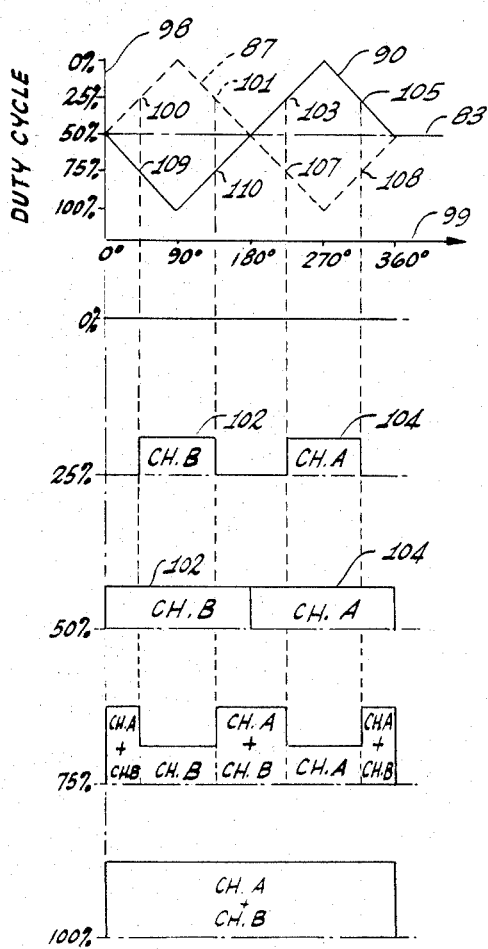
FIG. 4 is a graphical representation relating one cycle of the control signals for the two valves of FIG. 3 to the modulated control pulses and resulting flow pulses obtained under selected exemplary control conditions.

The effects of variations in the level of the input signal on the width of the signal pulses from the pulse generators and modulators 91 and 93, and thus on the duration of the valve-open time during each cycle and the resulting flow volume during each cycle, are shown graphically in FIG. 4. One cycle of the triangular waveforms 87 and 90 is shown at the top of FIG. 4, the unaltered waveform 87 of channel B being shown as a broken line and the inverted wave form of channel A being shown as a full line. Both of these waveforms vary equally above and below the median reference voltage level indicated at 83.

Representative voltage levels of the input signal applied to the modulators 91 and 93 through line 95 are plotted along the vertical axis 98 and identified as percentages of the total available flow per cycle, and the points along the full 360° cycle of the waveforms are plotted along the horizontal axis 99. As one of the waveforms 87, 90 increases through the selected signal voltage level (e.g. 25 percent), a pulse is initiated to energize the associated solenoid coil 45 and continues until the waveform decreases through the selected voltage level, at which instant the pulse is terminated.

Thus, when the signal voltage level is set the preselected amount above the median level 83 for 0 percent of the cycle, (in other words, for no output flow), no portion of either waveform ever exceeds this voltage level and no pulses are produced by either of the modulators. This is illustrated immediately beneath the waveforms in FIG. 4 as a straight line representing zero output flow rate and labeled 0 percent.

When the signal voltage is changed to the 25 percent level, the waveform 87 of channel B increases through this level at 45 percent (as indicated at 100) and decreases through this level at 135° (indicated at 101). Accordingly, the pulse 102 for actuating the associated solenoid has a width or duration equal to one quarter of the total cycle time. On the other hand, the inverted waveform 90 of channel A exceeds this signal voltage level at 225° (as indicated at 1103) to initiate the channel A pulse 104 during the second half of the cycle, and then returns through the signal voltage level at 315° (as indicated at 105) to terminate the pulse. The plot representing the two resulting pulses of the 25 percent cycle is shown beneath the 0 percent plot, and is labeled 25 percent.

If the signal voltage level is changed to the 50 percent level, a pulse 102 is produced in channel B from 0° to 180°, and a pulse 104 is produced in channel A from 180° to 360°. Thus, as one valve is opened, the other is closed, and the output of the controller is substantially equal to the output that would be obtained from a single control valve that is open continuously.

When the desired flow rate is greater than 50 percent of capacity, at least one of the valves 24a, 24b is open at all times, and both valves sometimes are open to combine their outputs. For example, when the input signal is set for 75 percent, the waveform of channel B exceeds the signal voltage level from 0° to 225° (at 107) and from 315° (at 108) to 360°. As a practical matter, each pulse is initiated at 315° of one cycle and continues through the end of the cycle into the next cycle until the waveform drops back below the median level to the 75 percent signal level. The pulse for channel A exceeds the signal level from 0° to 45° (at 109) and from 135° (at 110) to 360°, so each pulse is initiated at 135° and continues into the next cycle, to 45°. The resulting flow through each of the two valves is of a duration equal to 75 percent of one cycle, and these flows overlap and are combined for 25 percent of one cycle, as shown in the plot labeled 75 percent.

If the input signal is set for 100 percent, both waveforms remain above this level for the complete cycle, and the resulting "pulses" are, in effect, continuous, so that both solenoids are energized continuously. Thus, both valves remain open for a combined, continuous flow equal to double the flow capacity of one such valve.

It will be evident from the foregoing that the control system described in connection with FIG. 3 can be modified to control a single-valve embodiment of the type shown in FIG. 1, simply by eliminating one of the control channels of FIG. 3. With only one control channel, of course, no inverter is required.

Figure 5:
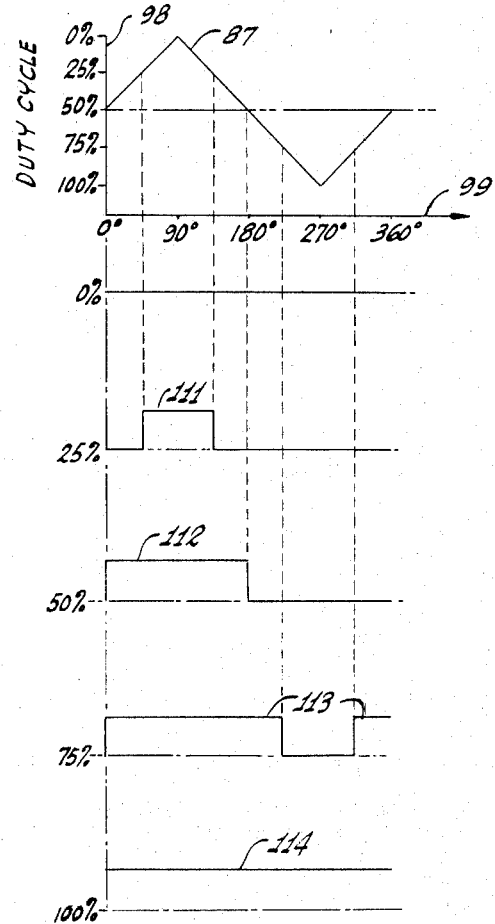
FIG. 5 is a graphical representation similar to FIG. 4 relating one cycle of the control signal for the single valve of FIG. 1 to the modulated control pulses and the resulting flow pulses under exemplary control conditions.

The actuation of such a single-channel control system, and the resulting signal pulses and flow periods, are graphically illustrated in FIG. 5. Again, a single cycle of the amplified electrical signal waveform 87 generated by the generator and modulator of the control channel for the single control valve is shown at the top of the figure, the horizontal axis 99 representing a full 360° cycle and the vertical axis 98 representing different levels for the input signal that is applied to the modulator to select the pulse-width output.

The second plot labelled 0 percent of FIG. 5 illustrates the pulse condition (no pulses, no flow) when the input signal is at the 0 percent level; the third plot labelled 25 percent shows the single, quarter-cycle pulse 111 produced when the input signal is set at the 25 percent level; and the third, fourth and fifth plots of the figure show, respectively, the pulses 112, 113 and 114 produced when the input signal is set at the 50 percent, 75 percent and 100 percent levels.

DESCRIPTION OF THE THIRD EMBODIMENT (FIG. 6)

Instead of increasing the number of control valves 24 in the flow controller in order to obtain increased flow rate capacity, the variable output of one control valve 24 (partially shown in FIG. 6) may be utilized in a novel manner as a pilot flow to vary the output flow through a second supply line 115 in proportion to variations in the pilot flow, which is combined with the second output flow as the total output of the controller. In this manner, it is possible to increase the output controlled by a single valve without increasing the mass of the moving components of the control valve, and the resulting power requirements, to impractical levels, using a flow multiplier 117 responsive to variations in the pilot flow rate to correspondingly vary a substantially larger secondary flow rate.

As shown in FIG. 6, the flow control valve and related elements of this embodiment may be identical to those shown in FIG. 1, and corresponding reference numbers are used to indicate corresponding elements that have been described previously with reference to FIG. 1. The flow multiplier 117 is housed in a hollow extension 118 of the controller housing, and receives the controlled output flow from the outlet chamber 23 through the outlet port 25 of the housing. While the secondary flow to be controlled may be supplied by a second source (not shown), herein the pump 11 supplies the secondary flow as well, through a branch line of the input line 13 forming the second line 115. This line opens into the flow multiplier through an inlet port 119 in the sidewall of the housing extension 118. Thus, a portion of the output of the pump is fed through the inlet port to the primary inlet chamber 18, and the excess output of the pump is available for delivery through the branch line 115 to the flow multiplier 117.

In general, the flow multiplier 117 comprises a valve spool 120 that is slidably guided for back and forth movement in a bore 121 constituting the interior of the housing extension 118, and has means for admitting fluid from the secondary inlet port 119 to a combined outlet port 122 and the outlet line 15 at a variable rate determined by the position of the spool in the bore. In addition, the multiplier is responsive to the pilot flow rate through the outlet chamber 23 to variably position the spool along the bore and thereby vary the secondary flow rate in proportion to the pilot flow rate.

In this instance, the valve spool 120 is movable downwardly in the bore in response to increased pressure in (and flow rate through) the outlet chamber 23, and such downward movement progressively increases the effective flow area of the inlet port 119 to increase the secondary flow rate through the flow multiplier to the outlet port 122. The spool is urged yieldably upwardly in the bore 121 by a coiled spring 123 confined in the bore between the lower end of the spool and the bottom wall 124 of the housing extension and its upward movement is limited by an annular stop flange 125 which surrounds and defines the outlet port 25.

Formed in the upper end of the spool 120 is an orifice 127 which opens into a mixing chamber 128 in the upper end portion of the spool, and communicates with the combined outlet port 122 through at least one port 129 opening laterally out of the mixing chamber toward the combined outlet port. Herein, a plurality of angularly spaced ports 129 open out of the mixing chamber 128 into an annular groove around the spool between two axially spaced, annular ribs 130 and 131 forming lands which slide along the wall of the bore 121, above and below the combined outlet port.

Spaced axially from the lower rib 131, downwardly as viewed in FIG. 6, is a third annular rib 132 forming a land which is movable downwardly from the raised position shown in FIG. 6 in which the land bears against the wall of the bore 121 immediately above the level of the secondary inlet port 119. In the raised position shown, this rib closes the secondary inlet port and thus prevents any secondary flow.

The ribs 131 and 132 lie on opposite sides of a peripheral groove around the intermediate portion of the spool, and at least one passage 133 extends from this groove into a second chamber 134 formed in the intermediate portion of the spool. Herein, there are two such passages. Thus, when the spool 120 is moved downwardly far enough to shift the rib 132 below the upper boundary of the secondary inlet port 119, fluid can flow from the port through the passages 133 and into the intermediate chamber 134.

This chamber 134 opens upwardly into the mixing chamber 128 through a mixing orifice 135 that is larger than the pilot orifice 127 and has a flow area which has the same ratio to the area of the pilot orifice as the rate of pilot flow has to the desired rate of secondary flow. Thus, the secondary flow can pass through the spool to mix with the pilot flow and exit through the ports 129 and the combined outlet port 122. In addition, the intermediate chamber 134 communicates with the space 137 in the lower end portion of the bore 121 through a damping orifice 138 in the lower end of the spool, permitting fluid to flow to and from this space from the chamber 134 as the spool moves up and down in the bore. A fourth rib 139 on the spool forms a land that is spaced below the rib 132, and also below the secondary inlet port 119, to prevent any appreciable flow of fluid from the port 119 into the space 137 below the spool, except through the chamber 134 and the orifice 138.

With this arrangement, an increase in the pressure in the outlet chamber 23 increases the force on the upper end of the spool 120 acting against the spring 123, and shifts the spool downwardly in the bore 121 so as to crack open the secondary inlet port 119 and admit fluid from the secondary flow line 115 into the intermediate chamber 134. From this chamber, the secondary flow passes through the mixing port 135 into the mixing chamber 128, but also acts through the damping orifice 138 to raise the fluid pressure in the space 137 to the same pressure that exists in the intermediate chamber 134.

Accordingly, the spool 120 is shifted downwardly until the pressures acting on opposite ends of the spool are equal, ignoring the force of the spring 123, which is only great enough to support the spool in the raised position when the controller is inactive and to prevent displacement of the spool by external shocks. After the pressure in the intermediate chamber 134 and in the space 137 below the spool is raised to equal the pressure in the outlet chamber 23, the spool is balanced, with the rib 132 throttling the secondary flow through the port 119 to maintain the pressure balance.

The ratio of the flow areas of the mixing and pilot orifices 135 and 127 may be selected according to the flow ratio desired, for example, from three-to-one to as high as ten-to-one, or higher. Thus, with a single control valve 24 having a flow capacity on the order of 0.6 gallons per minutes, the total flow capacity may be on the order of six gallons per minute.

From the foregoing, it will be evident that the present invention provides a novel flow controller, and variations thereof, for selectively varying and regulating the rate of flow such as fuel in order to obtain different accurately controlled flow rates determined by the proportion of each cycle during which the control valve of the controller is open. Moreover, the preferred embodiments of the invention utilize electromechanical actuating means which enable the valve to respond to a train of electromechanical signal pulses, and thus allow electronic computation of fuel demand and easy and rapid conversion of such demand to the precise control signals for satisfying that demand. At the same time, the controller may be made quite durable and compact, and relatively inexpensive in construction, and is rapidly responsive and highly reliable in operation.

It will also be evident that, while specific embodiments of the invention have been illustrated and described for purposes of illustration, changes and modifications may be made without departing from the spirit and scope of the invention.

We claim:

1. A fluid supply system having, in combination;

means for supplying fluid at a substantially constant rate;

a flow controller having an inlet communicating with said source to receive fluid therefrom; and including an inlet chamber for receiving the fluid through said inlet, an outlet chamber, a connecting passage between said chambers, electromagnetic control valve means operable when activated to admit a pulse of fluid through said passage from said inlet chamber to said outlet chamber, and a return passage from said inlet chamber for receiving excess fluid therefrom;

means for producing a cyclical train of high frequency electromagnetic signal pulses of selectively variable pulse duration and applying said signal pulses to said control valve means to alternately energize and de-energize the latter and thereby activate the same cyclically for a proportion of each cycle determined by the selected signal pulse duration, whereby a series of pulses of fluid of preselected duration is passed from said inlet chamber to said outlet chamber;

means for varying the flow from said inlet chamber through said return passage in response to sustained pressure chains in one of said chambers and thereby maintaining the pressure differential across said connecting passage substantially constant to maintain a constant average flow through the connecting passage when the duration of said signal pulses is constant, and to vary said average flow in direct relation to variations in said signal pulse duration;

and accumulator means for receiving a portion of the flow from said control valve means through said outlet chamber during each pulse of flow through the control valve means and discharging said portion into said outlet chamber between such pulses, thereby to smooth out the pulsing flow from said control valve means as a substantially constant flow from said outlet chamber.

2. A fluid supply system as defined in claim 1 in which said control valve means comprise an output orifice between said connecting passage and said outlet chamber, a closure member movable rapidly back and forth, toward and away from said orifice, to alternately open and block the latter, and a solenoid having a reciprocating armature for moving said closure member toward and away from the orifice, said solenoid being alternately energized and de-energized by said pulses to pen said orifice cyclically for timed periods of said preselected duration.

3. A fluid supply system as defined in claim 1 in which said means for maintaining said pressure differential comprise a movable valve spool controlling the flow through said return passage and having one end exposed to the pressure in said inlet chamber and an opposite end exposed to the pressure in said outlet chamber, and a spring urging said spool toward said inlet chamber and in a direction to restrict the flow through said return passage.

4. A fluid supply system as defined in claim 3 further including means between said opposite end and said outlet chamber for delaying response of said spool to pressure changes in said outlet chamber and thereby avoiding any material response of said spool to momentary pressure changes resulting from pulses in the flow to the outlet chamber.

5. A fluid supply system as defined in claim 1 in which said accumulator means includes a movable member having one end exposed to the pressure in said inlet chamber and an opposite end exposed to the pressure of the fluid in the outlet chamber, and a spring urging said movable member toward said inlet chamber, said movable member being shifted toward said inlet chamber during charging of the accumulator and being shifted back toward the outlet chamber, against the action of said spring, to discharge fluid to said outlet chamber.

6. A fluid supply system as defined in claim 1 in which both said accumulator means and said means for maintaining said pressure differential comprise spools slidable in the opposite end portions of a common bore with said inlet chamber defined in the bore between said spools, springs urging said spools with preselected forces toward each other, one of said spools progressively restricting the flow through said return passage during movement toward said inlet chamber, and means for admitting fluid from said outlet chamber into the opposite ends of said bore.

7. A fluid supply system as defined in claim 6 in which said admitting means include a restricted flow passage leading to the end portion of the bore containing the spool for restricting the flow through said return passage, thereby to delay response of said means for maintaining said pressure differential and prevent any material response thereof to momentary pressure variations resulting from pulses in said flow.

8. A fluid supply system as defined in claim 1 in which said control valve means comprise two solenoid-operated valves arranged in parallel to receive fluid from said inlet chamber through said connecting passage, and activated in timed relation with each other to deliver pulses of fluid of preselected, variable duration to said outlet chamber.

9. A fluid supply system as defined in claim 1 further including a source of a secondary fluid flow of substantially greater magnitude than the maximum flow capacity of said control valve means, a secondary flow line for delivering said secondary flow to said controller, and a flow-multiplying valve for variably throttling said secondary flow in proportion to the regulated output of said control valve means, and including a valve member movable back and forth to progressively increase and decrease said secondary flow, means for applying the pressures of the fluid in said outlet chamber and of the throttled secondary flow to opposite ends of the valve member and causing the valve member to assume a position throttling said secondary flow until the pressure thereof equals the pressure in said outlet chamber, and flow orifices having different flow areas in a preselected ratio to each other for passing the output of said control valve means and said throttled secondary flow through said flowmultiplying valve in said preselected ratio and combining said flows as the output of said supply system.

10. A flow controller for selectively regulating a fluid output flow and having, in combination:
an inlet for receiving a flow of fluid;
a control valve communicating with said inlet to receive fluid therefrom and including an output orifice, a closure member movable rapidly back and forth relative to said orifice to open and close the latter, and electromagnetic operating means for moving said closure member back and forth relative to said orifice to admit a pulsing flow of fluid through the orifice;
means for producing a cyclical train of high-frequency electromagnetic pulses of selectively variable pulse duration and applying said pulses to said operating means to alternately energize and deenergize the operating means and thereby open and close said orifice cyclically for a proportion of each cycle determined by the selected pulse duration;
accumulator means communicating with said orifice to be charged with fluid during each output pulse and to discharge such fluid when the orifice is closed, thereby to smooth out pulses of fluid from said controller;
and means for maintaining the pressure differential across said orifice substantially constant to obtain an average flow through said orifice that is directly related to the proportion of the open time of the valve during each cycle.

11. A flow controller as defined in claim 10 in which said pulse-producing means include means for generating an electromagnetic signal having a cyclical waveform, and a pulse generator for producing an energizing pulse during each cycle of the wave form and selectively modulating the portion of each cycle during which the pulse is produced.

12. A flow controller as defined in claim 11 in which said pulse-producing means generates a triangular waveform varying equally above and below a median level, and said pulse generator is responsive to a selectively variable input signal to vary the level of said waveform at which said pulses are initiated and terminated.

13. A flow controller as defined in claim 10 including means for supplying fluid to said inlet at a substantially constant rate, and in which said controller has an inlet chamber communicating with said inlet and said orifice, and an outlet chamber for receiving the pulsing flow through said orifice;
said means for maintaining the pressure differential across said orifice including a pressure-responsive relief valve having a movable valve spool with one end exposed to the pressure in said inlet chamber and an opposite end exposed to the pressure in said outlet chamber, means urging said spool toward said inlet chamber with a preselected force, and a return for bleeding fluid from said inlet chamber at a variable rate determined by the position of said valve spool.

14. A flow controller as defined in claim 13 further including means for delaying movement of said valve spool in response to changes in the pressure differential between said chambers and thereby preventing any material response of said valve spool to momentary pressure changes attributable to pulses in the flow through said orifice.

15. A flow controller as defined in claim 10 further including at least a second control valve communicating with said inlet to receive fluid therefrom and similarly having a second output orifice in parallel with the first-mentioned orifice, a second closure member movable rapidly back and forth relative to said second orifice to open and close the latter, and second electromagnetic operating means for moving said second closure member back and forth relative to said second orifice to admit a pulsing flow of fluid through the second orifice, and in which said pulse-producing means produces a second cyclical train of pulses for energizing and deenergizing said second operating means out of phase with the first-mentioned operating means to combine the flows through the two orifices as the output of said controller.

16. A flow controller as defined in claim 10 further including flow-multiplying means responsive to variations in the output of said control valve and operable to proportionally vary a secondary flow of fluid of substantially greater magnitude.

17. A flow controller as defined in claim 16 in which said flow-multiplying means include a source for supplying said secondary flow and a secondary inlet, a movable valve member for variably throttling the flow through said secondary inlet, means for applying the throttled secondary flow to one side of said valve member in opposition to the pressure of the output of the control valve on the other side of the member, and thereby positioning the valve member to equalize said pressures, and mixing orifices having a preselected flow area ratio for admitting the two flows through said valve member at rates having said preselected ratio.

18. A flow controller for selectively regulating a fluid output flow and having, in combination:
an inlet for receiving fluid;
control valve means for receiving fluid from said inlet and operable when activated to admit a pulse of fluid through the valve from said inlet;
means for activating said control valve means cyclically and for intervals of preselected and selectively variable duration to pass a series of pulses of fluid of said preselected duration through the control valve means;
accumulator means communicating with said valve means and receiving a portion of the output thereof during each pulse and then automatically discharging said portion between pulses to smooth out the output to a substantially constant flow;

and means for maintaining the fluid pressure differential across said valve means substantially constant to produce an average output flow through the valve means that varies in direct relation to variations in the duration of said fluid pulses.

19. A flow controller as defined in claim 18 in which said control valve means comprise at least one electromagnetic control valve receiving fluid from said inlet and having a reciprocating valve member movable back and forth between open and closed positions, and said activating means is a control system for producing a cyclical train of high-frequency electromagnetic pulses of selectively variable pulse duration to alternately energize and deenergize the control valve and maintain the latter open during each cycle for a selected and variable time interval.

20. A flow controller as defined in claim 19 in which said activating means produces a plurality of electromagnetic pulses per second.

21. A flow controller as defined in claim 18 further including flow multiplying means responsive to variations in the output flow rate through said control valve means and operable to deliver a proportionally varying secondary output flow of substantially greater magnitude than the flow rate through said control valve means.

* * * * *